3,277,064
POLYMERISATION PROCESS

Victor Gordon Lovelock, Welwyn Garden City, and Lyle Eugene Perrins, St. Albans, England, assignors to Imperial Chemical Industries Limited, London, England, a corporation of Great Britain
No Drawing. Filed May 31, 1961, Ser. No. 113,638
Claims priority, application Great Britain, June 7, 1960, 19,927/60
11 Claims. (Cl. 260—87.1)

This invention relates to a process for the production of improved polymers and copolymers of vinyl chloride The production of polymeric compositions having antistatic properties is well known, but hitherto the inclusion of compounds donating the antistatic properties has often resulted in a product which is very sticky, has bad flow properties and generally poor handling characteristics.

It is an object of this invention to provide a process for the production of polymers and copolymers of vinyl chloride giving products with good antistatic properties and improved handling characteristics.

According to the present invention we provide a process for the polymerisation of vinyl chloride alone or with other copolymerisable monomers in aqueous medium in which at least part of the polymerisation takes place in the presence of at least 0.5% by weight of the monomer or monomers to be polymerised of a compound selected from the class consisting of cationic quaternary ammonium compounds having the general formula

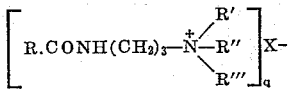

where R represents a member of the group consisting of aliphatic hydrocarbon radicals containing at least 5 carbon atoms, R' designates a radical represented by the formula $-(C_nH_{2n}O)_mH$ where $n$ is a positive integer from 2 to 4 inclusive and $m$ is a positive integer, R'' represents a member of the group consisting of alkyl and hydroalkyl radicals containing from 1 to 5 carbon atoms inclusive and radicals having the same meaning as R', R''' represents a member of the group consisting of hydrogen and radicals having the same meaning as R'', X represents an anion and $q$ is a whole number equal to the valency of X. Also according to our invention, we provide polymers and copolymers of vinyl chloride whenever prepared by this process.

The amount of quaternary ammonium compound used during the polymerisation is generally not greater than 7% by weight of the monomer or monomers to be polymerised, because above this amount the improvement in antistatic properties is significant. However, greater amounts may be used if desired, and the resulting composition mixed with a predetermined amount of untreated polymer to give any desired concentration of quaternary ammonium compound in the resultant mixture. Although it is feasible to use very much greater amounts of the quaternary ammonium compound, in the polymer, compositions containing more than about 15% tend to suffer in their handling characteristics.

When there is no intention to mix the product with further polymeric material before processing, we prefer the concentration of the quaternary ammonium compound to be not more than 4% by weight since greater quantities may have a deleterious effect on the properties of the product made by moulding the polymer. Similarly, where a composition of high (i.e. greater than 4%) quaternary ammonium compound concentration is mixed with further untreated polymeric material, we prefer the resultant mixture to have a quaternary ammonium compound concentration of not more than 4%.

Examples of radicals represented by R in the formula are heptyl, octyl, octenyl, nonyl, nonenyl, decyl, decenyl, undecyl, undecenyl, tridecyl, tetradecyl, tetradecenyl, heptadecyl, heptadecenyl, octadecyl, octadecenyl etc. and isomers thereof. Examples of radicals represented by R' are those having the structures $HOC_2H_4-$, $H(OC_2H_4)_6-$, $HOC_3H_6-$, $H(OC_3H_6)_7-$, $HOC_4H_8-$, $H(OC_4H_8)_{10}-$ and their homologues. Examples of radicals represented by R'' and R''' are methyl, ethyl, propyl, isopropyl, n-butyl, isobutyl, tert.-butyl, isoamyl, n-amyl, sec-amyl, tert.-amyl and other isomeric amyl radicals and hydroxy compounds as exemplified for R'. Examples of anions represented by X are the halide ions, sulphate, phosphate, borate, carbonate, nitrate, nitrate, cyanate, acetate and other common inorganic and organic ions.

Examples of quaternary ammonium compounds useful in the process of our invention include γ-myristoamidopropyl dimethyl benzyl ammonium chloride, caprylylamidopropyl dimethyl β-hydroxyethyl ammonium bromide, lauramidopropyl methyl bis (β-hydroxyethyl)ammonium chloride, stearamidopropyl dimethyl β-hydroxyethyl ammonium nitrate and stearamidopropyl dimethyl β-hydroxyethyl ammonium phosphate. Of these compounds, we prefer the stearamidopropyl ammonium salts and in particular the stearamidopropyl dimethyl β-hydroxyethyl ammonium salts because of their good antistatic properties, ready availability and relatively small effect on the other properties of products fabricated from the polymers.

Examples of monomers, copolymerisable with vinyl chloride are vinyl acetate, methacrylonitrile, acrylonitrile, methyl methacrylate, methyl acrylate, ethyl acrylate, 2-ethyl-hexyl acrylate, methyl-α-chloro-acrylate, maleic acid, diethyl maleate, fumaric acid, diethyl fumarate, di-n-propyl fumarate, vinylidene chloride and acrylic acid.

The polymerisation of vinyl chloride in aqueous medium may be carried out by any of the well known emulsion or dispersion techniques. When the dispersion process is used it is preferably in conjunction with a homogeniser as homogensing produces a stable latex. Polymerisation may be by batch, semi-continuous or continuous operation.

When the polymerisation is effected by an emulsion process in which the monomer is polymerised while dispersed in water and in the presence of a water-soluble catalyst, the quaternary ammonium compound acts as an emulsifying agent as well as donating antistatic properties to the final product. The addition of emulsifying agent to the system may be effected in one step or in any number of steps or continuously during the course of at least part of the remainder of the polymerisation after the initial introduction. It is preferred to keep the concentration of emulsifying agent at all stages of the polymerisation as low as possible without coagulation occurring and this may best be achieved by adding the agent stepwise or in a continuous manner. If the final latex prepared in this way does not have the required stability, this may be remedied by adding further emulsifying agent towards the end of the polymerisation, e.g. just before venting the autoclave of unreacted monomer. This may be necessary for example when it is desired to separate the polymer from the latex by spray drying, or to increase the amount of quaternary ammonium compound in the final polymer (e.g. for use in master-batching). If desired, further amounts of quaternary ammonium compound may be added to the polymer suspension after venting.

Any of the usual water soluble catalysts and antifoam agents may be used in the process. For example, catalysts that may be used include peroxy compounds such as hydrogen peroxide, per-esters such as sodium peracetate and the alkali metal and ammonium persulphates.

The catalysts may if desired be used in conjunction with an activator. For example, the polymerisation may be carried out in the presence of hydrogen peroxide activated by a water-soluble salt of a heavy metal such as copper or iron, or in the presence of a persulphate activated by a water-soluble copper salt. In the second case, the polymerisation may be carried out additionally in the presence of a small partial-pressure of oxygen such as described in British specifications No. 589,264 and 598,777.

Typical antifoam agents that may be used are the silicones.

As the polymerisation proceeds, additional quantities of monomeric material may be added if desired.

If a dispersion polymerisation process is used, in which the catalyst is monomer soluble, the reaction vessel is normally charged initially with water, the catalyst, an antifoam agent and some of the quaternary ammonium compound which in this case acts as a dispersing agent as well as antistatic agent in the final polymer, and the vessel is then purged. The monomers are added and stirred and the mixture is preferably homogenised by recycling through a homogeniser. The stirring should be just sufficient to cope with the heat transfer but if it is too rapid, there may be a danger of breaking the emulsion. The quaternary ammonium compound can be charged in one step, discontinuously or continuously throughout the reaction.

Catalysts which may be used for this procedure include organic peroxides such as benzoyl peroxide, lauroyl peroxide, tertiary butyl peroxy-benzoate and other monomer soluble organic peroxides and hydroperoxides, and also monomer-soluble azo-compouunds such as $\alpha,\alpha'$-azo-bis-isobutyronitrile, diisopropyl 2,2'-azo-bis-isobutyrate and phenyl-azo-triphenylmethane.

The polymers produced by these processes may be dried by spray-, drum-, or tray-drying techniques or any other techniques for drying polymeric materials. Common additives such as plasticisers, pigments, fillers and heat and light stabilisers may be used to modify the polymer and the product may be used in the production of coatings, films and shaped articles by moulding, extruding, calendering, solvent-casting and other processes of treatment and fabrication commonly applied to vinyl chloride polymers. The polymers may also be compounded or blended with any other polymeric materials.

Normally in the production of compositions with antistatic properties it has been usual to add the antistatic agent to the polymer after the polymerisation process and this has often resulted in a sticky unmanageable powder which tends to clog any machinery through which it passes. However, as the antistatic agent (which may in itself be inherently sticky) is in this case present during the polymerisation process itself, it is finely distributed over a larger surface area of the polymer than would otherwise be practicable and the result is a composition which is in general a dry, dust-free powder which is not noticeably sticky, has good flow properties and improved handling characteristics and gives a product with good antistatic properties.

Our invention is illustrated, but in no way limited, by the following examples in which all parts are expressed as parts by weight.

EXAMPLE 1

*Polymerisation by emulsion process*

| | Parts |
|---|---|
| Distilled water | 129 |
| 100 vol. hydrogen peroxide | 0.17 |
| Silicone antifoam agent | 0.008 |

Stearamidopropyl dimethyl $\beta$-hydroxyethyl ammonium nitrate:
(a) 0.505 part of 100% active agent as a 50% solution in a 1:1 isopropanol/water mixture further diluted with 25.9 parts of water.
(b) 2.66 parts of 100% active agent as a 50% solution in a 1:1 isopropanol/water mixture made up to 17.2 parts of solution.

| | |
|---|---|
| Vinyl chloride | 100 |
| Vinyl acetate | 20.7 |

The water, hydrogen peroxide, antifoam agent and 0.645 part of solution (a) of the quaternary ammonium compound were charged into an autoclave which was then purged free of oxygen by pressurising the vessel to 50 p.s.i. with nitrogen three times and venting after each time to atmospheric pressure.

The autoclave was then heated to 68° C. and all the monomeric material was added and the mixture stirred. The remainder of quaternary ammonium compound solution (a) was added over a period of 4 hours and a short period before the pressure in the reaction vessel reached 50 p.s.i., the quaternary ammonium compound solution (b) was added. The batch was vented when the pressure reached 50 p.s.i.

After the batch was cooled, the latex produced was spray-dried to give a free flowing powder which was used to produce a gramophone record which when rubbed and held over an open dish of finely divided cigarette ash attracted none, thus demonstrating good antistatic properties.

EXAMPLE 2

*Polymerisation by dispersion process with homogenisation*

| | |
|---|---|
| Distilled water | 242 |
| Vinyl acetate | 20.7 |
| Vinyl chloride | 100 |
| Lauroyl peroxide | 0.69 |
| Silicone antifoam agent | [1] 0.0077 |

Stearamidopropyl dimethyl $\beta$-hydroxyethyl ammonium nitrate:
(a) 1.9 parts of 100% active agent as a 60% solution in a 1:1 isopropanol/water mixture.
(b) 0.6 part of 100% active agent as a 60% solution in a 1:1 isopropanol/water mixture.

[1] Added as a 5% solution in chloroform.

The water, lauroyl peroxide, antifoam and quaternary ammonium compound solution (a) were charged into the autoclave which was then purged. The monomeric material was then charged and stirred for 1 hour. The mixture was then homogenised by recycling through a homogeniser. The mixture was stirred sufficiently to cope with the heat transfer but not too fast in order to avoid breaking the emulsion. The reactants were heated to 72° C. and solution (b) of the quaternary ammonium compound was added towards the end of the reaction, a short period before venting at 75 p.s.i. The latex was dried to give a free-flowing powder which was moulded as in Example 1 to give a gramaphone record similar antistatic properties.

EXAMPLE 3

The process of Example 1 was repeated using

| | Parts |
|---|---|
| Distilled water | 151 |
| Ammonium persulphate | 0.251 |
| Silicone antifoam agent | 0.0755 |

Stearamidopropyl dimethyl $\beta$-hydroxyethyl ammonium nitrate: 12.3 parts of 100% active agent as a 50% solution in a 1:1 isopropanol/water mixture.

| | |
|---|---|
| Vinvyl chloride | 100 |
| Ethyl acrylate | 11.1 |

The temperature of the polymerisation was 70° C. and all the quaternary ammonium salt was charged at the start.

After venting the autoclave, the latex was dried to give a free flowing powder which gave a moulding having good antistatic properties.

EXAMPLE 4

The process of Example 1 was repeated using

| | Parts |
|---|---|
| Distilled water | 120 |
| 100 vol. hydrogen peroxide | 0.085 |
| Silicone antifoam agent | 0.068 |

Stearamidopropyl dimethyl β-hydroxyethyl ammonium nitrate:
    (a) 0.385 part of 100% active agent as a 50% solution in a 1:1 isopropanol/water mixture further diluted by 17.3 parts of water.
    (b) 0.517 part made up to 96.2 parts of solution by water.

| | |
|---|---|
| Vinyl chloride | 100 |

The water, catalyst, antifoam agent and 0.472 part of solution (a) were charged at the beginning and the vinyl chloride was added after purging. The temperature of polymerisation was 70° C. 0.0114 part of sodium formaldehyde sulphoxylate was added to the remainder of solution (a) and this was added to the polymerisation medium over a period of 6 hours. Shortly before venting, solution (b) was added.

On drying the latex, a fine dry powder was obtained which showed good handling and antistatic properties.

EXAMPLE 5

The process of Example 3 was repeated using

| | Parts |
|---|---|
| Distilled water | 128 |
| Ammonium persulphate | 0.221 |
| Silicone antifoam agent | 0.068 |

Stearamidopropyl dimethyl β-hydroxyethyl ammonium phosphate: 8.1 parts of 100% active agent as a 34% solution in a 1:1 isopropanol/water mixture.

| | |
|---|---|
| Vinyl chloride | 100 |

After venting, the latex was spray-dried to give a dry, easy-handled, powder with good antistatic properties.

We claim:

1. A process for the polymerisation of monomeric material selected from the class consisting of vinyl chloride and mixtures of vinyl chloride with minor amounts of other monoethylenically unsaturated copolymerisable monomers selected from the group consisting of vinyl acetate, methacrylonitrile, acrylonitrile, methyl methacrylate, methyl acrylate, ethyl acrylate, 2-ethyl-hexyl acrylate, methyl-α-chloro-acrylate, maleic acid, diethyl maleate, fumaric acid, diethyl fumarate, di-n-propyl fumarate, vinylidene chloride and acrylic acid which comprises polymerizing said monomeric material in aqueous medium in the presence of a free radical polymerisation catalyst, at least part of the polymerisation taking place in the presence of from 0.05% to 15% by weight of the monomeric material to be polymerised of a class of cationic quaternary ammonium compounds of the general formula

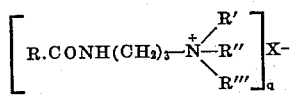

where R represents a member of the group consisting of saturated aliphatic hydrocarbon radicals containing at least 5 carbon atoms, R' designates a radical represented by the formula —$(C_nH_{2n}O)_mH$ where $n$ is a positive integer from 2 to 4 inclusive and $m$ is a positive integer, R" represents a member of the group consisting of alkyl and hydroxyalkyl radicals containing from 1 to 5 carbon atoms inclusive and radicals having the same meaning as R', R'" represents a member of the group consisting of hydrogen and radicals having the same meaning as R", X represents an anion and $q$ is a whole number equal to the valency of X.

2. A process according to claim 1 in which the quaternary ammonium compound is a stearamidopropyl ammonium salt.

3. A process according to claim 2 in which the quaternary ammonium compound is a stearamidopropyl dimethyl β-hydroxyethyl ammonium salt.

4. A process according to claim 3 in which the quaternary ammonium compound is a stearamidopropyl dimethyl β-hydroxyethyl ammonium nitrate.

5. A process according to claim 1 in which vinyl chloride is copolymerised with vinyl acetate.

6. A polymer composition containing up to 4% by weight of a quaternary ammonium compound and prepared by polymerising monomeric material selected from the class consisting of vinyl chloride and mixtures of vinyl chloride with minor amounts of other monoethylenically unsaturated copolymerisable monomers in aqueous medium selected from the group consisting of vinyl acetate, methacrylonitrile, acrylonitrile, methyl methacrylate, methyl acrylate, ethyl acrylate, 2-ethyl-hexyl acrylate, methyl-α-chloro-acrylate, maleic acid, diethyl maleate, fumaric acid, diethyl fumarate, di-n-propyl fumarate, vinylidene chloride and acrylic acid in which at least part of the polymerisation takes place in the presence of from 0.05% to 4% by weight of the monomeric material to be polymerised of a class of cationic quaternary ammonium compounds of the general formula

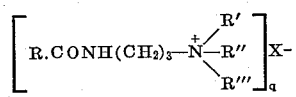

where R represents a member of the group consisting of saturated aliphatic hydrocarbon radicals containing at least 5 carbon atoms, R' designates a radical represented by the formula —$(C_nH_{2n}O)_mH$ where $n$ is a positive integer from 2 to 4 inclusive and $m$ is a positive integer, R" represents a member of the group consisting of alkyl and hydroxyalkyl radicals containing from 1 to 5 carbon atoms inclusive and radicals having the same meaning as R', R'" represents a member of the group consisting of hydrogen and radicals having the same meaning as R", X represents an anion and $q$ is a whole number equal to the valency of X.

7. A moulding powder derived from the polymer composition of claim 6.

8. A gramophone record formed from the moulding powder of claim 7.

9. A polymer composition containing from 4% to 15% by weight of a quaternary ammonium compound and prepared by polymerising monomeric material selected from the class consisting of vinyl chloride and mixtures of vinyl chloride with minor amounts of other monoethylenically unsaturated copolymerisable monomers in aqueous medium selected from the group consisting of vinyl acetate, methacrylonitrile, acrylonitrile, methyl methacrylate, methyl acrylate, ethyl acrylate, 2-ethyl-hexyl acrylate, methyl-α-chloro-acrylate, maleic acid, diethyl maleate, fumaric acid, diethyl fumarate, di-n-propyl fumarate, vinylidene chloride and acrylic acid in which at least part of the polymerisation takes place in the presence of from 4% to 15% by weight of the monomeric material to be polymerised of a class of cationic quaternary ammonium compounds of the general formula

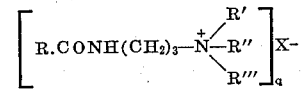

where R represents a member of the group consisting of saturated aliphatic hydrocarbon radicals containing at least 5 carbon atoms, R' designates a radical represented by the formula —$(C_nH_{2n}O)_mH$ where $n$ is a positive integer from 2 to 4 inclusive and $m$ is a positive integer, R" represents a member of the group consisting of alkyl and hydroxyalkyl radicals containing from 1 to 5 carbon atoms inclusive and radicals having the same meaning as R', R'" represents a member of the group consisting of hydrogen and radicals having the same meaning as R", X represents an anion and $q$ is a whole number equal to the valency of X.

10. A moulding powder containing up to 4% by weight of a quaternary ammonium compound and derived by blending a vinyl chloride polymer with the polymer composition of claim 9.

11. A gramophone record formed from the moulding powder of claim 10.

References Cited by the Examiner

UNITED STATES PATENTS

| | | | |
|---|---|---|---|
| 2,626,876 | 1/1953 | Carnes | 117—138.8 |
| 2,626,877 | 1/1953 | Carnes | 117—138.8 |
| 2,654,729 | 10/1953 | Price | 260—87.5 |
| 2,883,370 | 4/1959 | Price | 260—87.5 |
| 3,150,120 | 9/1964 | Perrins | 260—87.1 |

OTHER REFERENCES

Schildknecht: Vinyl and Related Polymers, page 437, Wiley, N.Y. (1952).

JOSEPH L. SCHOFER, *Primary Examiner.*

HAROLD N. BURSTEIN, WILLIAM H. SHORT,
*Examiners.*

J. F. McNALLY, *Assistant Examiner.*